(12) United States Patent
Park et al.

(10) Patent No.: US 9,769,498 B2
(45) Date of Patent: Sep. 19, 2017

(54) METHOD AND APPARATUS FOR ENCODING OF VIDEO USING DEPTH INFORMATION

(71) Applicant: University-Industry Cooperation Group of Kyung Hee University, Yongin-si, Gyeonggi-do (KR)

(72) Inventors: Gwang Hoon Park, Seongnam-si (KR); Tae Wook Kim, Suwon-si (KR); Yoon Jin Lee, Yongin-si (KR)

(73) Assignee: UNIVERSITY-INDUSTRY COOPERATION GROUP OF KYUNG HEE UNIVERSITY, Yongin-Si (KR)

( * ) Notice: Subject to any disclaimer, the term of this patent is extended or adjusted under 35 U.S.C. 154(b) by 192 days.

(21) Appl. No.: 14/631,419

(22) Filed: Feb. 25, 2015

(65) Prior Publication Data
US 2015/0281727 A1 Oct. 1, 2015

(30) Foreign Application Priority Data

Mar. 28, 2014 (KR) .................. 10-2014-0037277
May 16, 2014 (KR) .................. 10-2014-0059065

(51) Int. Cl.
| H04N 19/52 | (2014.01) |
| H04N 19/172 | (2014.01) |
| H04N 19/597 | (2014.01) |
| H04N 19/14 | (2014.01) |
| H04N 19/57 | (2014.01) |

(52) U.S. Cl.
CPC .......... *H04N 19/597* (2014.11); *H04N 19/57* (2014.11)

(58) Field of Classification Search
None
See application file for complete search history.

(56) References Cited

U.S. PATENT DOCUMENTS

| 8,395,642 B2* | 3/2013 | Yea | G06T 3/0093 |
| | | | 345/647 |
| 2009/0060280 A1* | 3/2009 | Choi | G06T 7/0075 |
| | | | 382/106 |
| 2009/0290641 A1* | 11/2009 | Crinon | H04N 19/56 |
| | | | 375/240.16 |

(Continued)

FOREIGN PATENT DOCUMENTS

| KR | 10-2012-0137305 A | 2/2001 |
| KR | 10-1337345 B | 12/2013 |

(Continued)

OTHER PUBLICATIONS

Dong In Bae, HEVC Encoder Optimization using Depth Information, Thesis for master degree in Kyung Hee University Graduate School, Feb. 28, 2013.

(Continued)

*Primary Examiner* — Mohammad J Rahman
(74) *Attorney, Agent, or Firm* — Sughrue Mion, PLLC

(57) ABSTRACT

An image encoding method using a depth information includes determining a motion searching range in a total motion searching region for calculating a motion vector of a current coding unit (CU) based on an object information of the current CU; and determining an optimum motion vector of the current CU based on a motion information inside the motion searching range.

17 Claims, 16 Drawing Sheets

(56) References Cited

U.S. PATENT DOCUMENTS

| | | | | |
|---|---|---|---|---|
| 2010/0238160 | A1* | 9/2010 | Yea | G06T 3/0093 |
| | | | | 345/419 |
| 2011/0170602 | A1* | 7/2011 | Lee | H04N 19/44 |
| | | | | 375/240.16 |
| 2011/0206124 | A1* | 8/2011 | Morphet | G06T 7/2013 |
| | | | | 375/240.16 |
| 2012/0120200 | A1* | 5/2012 | Newton | H04N 13/0003 |
| | | | | 348/46 |
| 2012/0293627 | A1* | 11/2012 | Ishii | H04N 13/0011 |
| | | | | 348/46 |
| 2014/0085416 | A1 | 3/2014 | Chang et al. | |
| 2014/0168362 | A1* | 6/2014 | Hannuksela | H04N 13/0048 |
| | | | | 348/43 |
| 2014/0192155 | A1* | 7/2014 | Choi | H04N 19/00769 |
| | | | | 348/43 |
| 2014/0348238 | A1* | 11/2014 | Morphet | G06T 7/2013 |
| | | | | 375/240.16 |
| 2015/0208094 | A1* | 7/2015 | Lee | H04N 19/96 |
| | | | | 375/240.2 |

FOREIGN PATENT DOCUMENTS

| | | |
|---|---|---|
| KR | 10-20140008984 A | 1/2014 |
| KR | 10-2014-0048784 A | 4/2014 |

OTHER PUBLICATIONS

Korean Notice of Allowance for corresponding Application No. 10-2014-0059065 issued Dec. 28, 2015.

* cited by examiner

FIG. 10
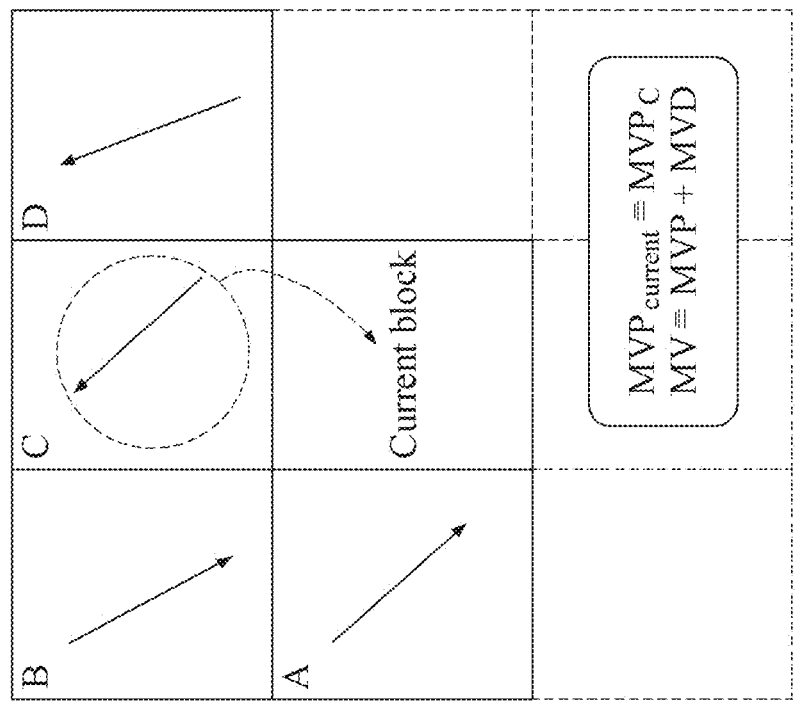
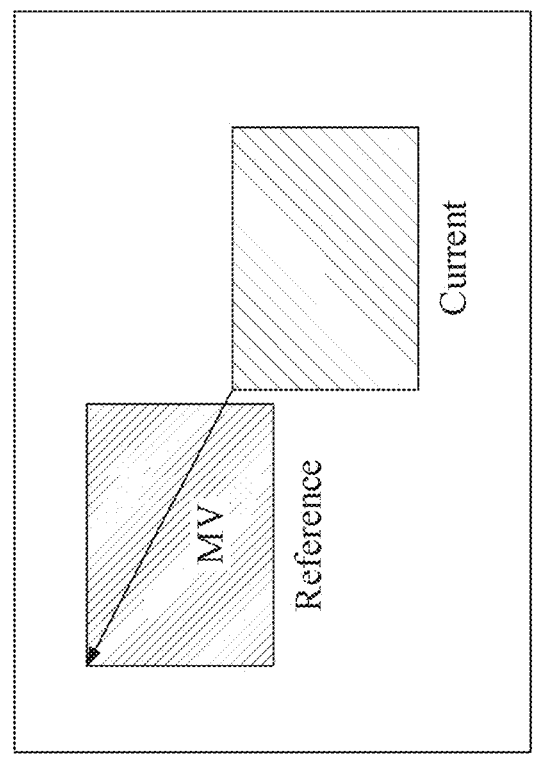
(B)
(A)

FIG. 11
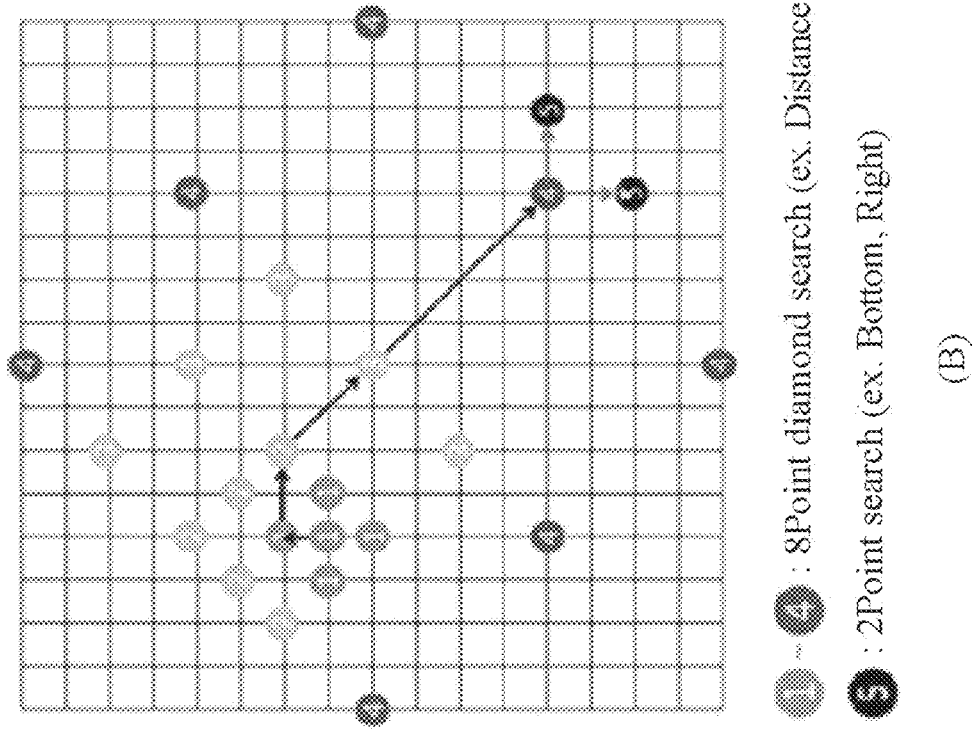
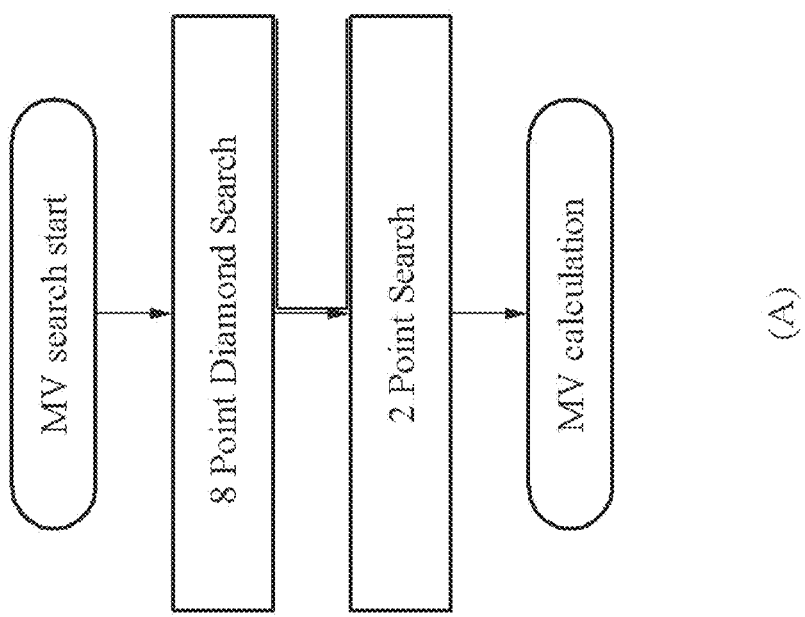

METHOD AND APPARATUS FOR ENCODING OF VIDEO USING DEPTH INFORMATION

CROSS-REFERENCE TO RELATED APPLICATION

This application claims the benefit under 35 U.S.C. §119(a) of Korean Patent Application No. 10-2014-0037277, filed Mar. 28, 2014, and No. 10-2014-0059065, filed on May 16, 2014, in the Korean Intellectual Property Office, which are incorporated herein by reference in their entirety.

BACKGROUND

1. Technical Field

The present disclosure relates to an encoding of a video using a depth information, and more particularly, to a method and an apparatus of inducing an object information and efficiently encoding an image using a depth information.

2. Discussion of the Related Art

A depth information image has been widely used in an encoding of a three-dimensional video, and a depth information camera of a new input device such as a Kinect camera of an Xbox game machine, an Intel SENZ3D webcam, an iSense 3D scanner of an iPad and a Google Tango Smartphone may be used for various 3D and 2D applications.

In addition, 2D/3D application has been popularized through various 2D/3D services due to popularization and dissemination of the depth information camera. As a result, a future multimedia camera system may include the depth information camera to utilize a variety of information.

Patent documents of the prior art documents are as follows: (patent document 1) US 2014/0085416 (Title of the Invention: METHOD AND APPARATUS OF TEXTURE IMAGE COMPRESS IN 3D VIDEO CODING); (patent document 2) KR 10-2012-0137305 (Title of the Invention: METHOD OF DIVIDING BLOCKS AND APPARATUS USING THE SAME); and (patent document 3) KR 10-2014-0048784 (Title of the Invention: METHOD AND APPARATUS OF INDUCING MOTION INFORMATION BY SHARING RESTRICTIVE DEPTH INFORMATION VALUE).

SUMMARY

Embodiments of the present disclosure relate to a method and apparatus of encoding a video using a depth information. Accordingly, one exemplary embodiment is directed to a method for encoding a video that substantially obviates one or more of the problems due to limitations and disadvantages of the related art.

An object of the present invention is to provide a method and an apparatus of encoding a video where deterioration in performance is prevented and efficient encoding is obtained by using a depth information when a two-dimensional video is encoded.

Advantages and features of the disclosure will be set forth in part in the description, which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

To achieve other advantages and features in accordance with the purpose according to one aspect of the disclosure, one exemplary embodiment is an image encoding method using a depth information including: determining a motion searching range in a total motion searching region for calculating a motion vector of a current coding unit (CU) based on an object information of the current CU; and determining an optimum motion vector of the current CU based on a motion information inside the motion searching range.

In another aspect, one exemplary embodiment is an image encoding method using a depth information including: verifying a total motion searching region for calculating a motion vector of a current coding unit (CU); determining whether a motion search in a current motion searching location is performed or not according to a depth information of the current CU extracted from a depth image; and determining an optimum motion vector of the current CU considering a result of the step of determining whether the motion search in the current motion searching location is performed or not.

In another aspect, one exemplary embodiment is an image encoding apparatus using a depth information including: a motion searching range determining unit determining a motion searching range in a total motion searching region for calculating a motion vector of a current coding unit (CU) based on an object information of the current CU; and a motion vector determining unit determining an optimum motion vector of the current CU based on a motion information inside the motion searching range.

In another aspect, one exemplary embodiment is an image encoding apparatus using a depth information including: a motion search determining unit determining verifying a total motion searching region for calculating a motion vector of a current coding unit (CU) and determining whether a motion search in a current motion searching location according to the depth information of the current CU, which is extracted from a depth image, is performed or not; and a motion vector determining unit determining an optimum motion vector of the current CU.

It is to be understood that both the foregoing general description and the following detailed description are exemplary and explanatory, and are intended to provide further explanation of the embodiments as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

FIG. 10 is an example of an obtaining method for a motion information of a current block from a reference block according to the prior art.

FIG. 11 is an example of an obtaining method for a motion vector according to the prior art.

FIG. 18 is a view showing examples of a depth value distribution of a CU.

DETAILED DESCRIPTION

Figure 1:
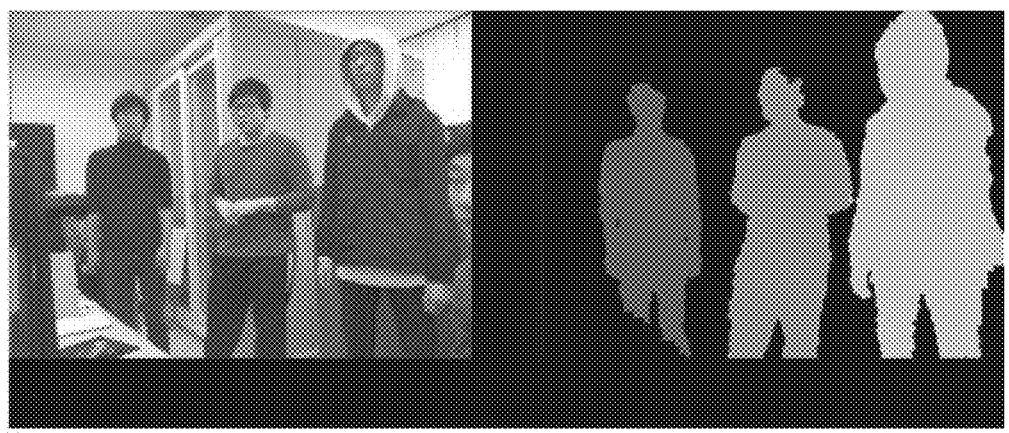
FIG. 1 is an exemplary view showing a general image and a depth information map of a general image.

Reference will now be made in detail to embodiments of the present disclosure, examples of which are illustrated in the accompanying drawings. In the following description, when a detailed description of well-known functions or configurations related to this document is determined to unnecessarily cloud a gist of an embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
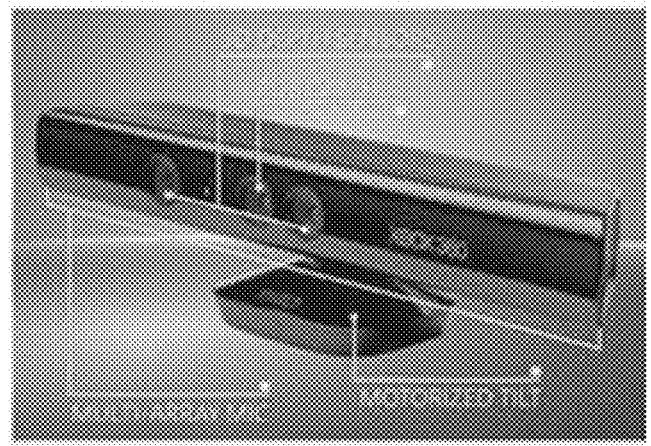
FIG. 2 is an exemplary view showing a Kinect input device.

FIG. 1 is an exemplary view showing a general image and a depth information map of a general image, and FIG. 2 is an exemplary view showing a Kinect input device.

In FIG. 1, the left view shows a real image taken by a camera, and the right view shows a depth image of a real image, i.e. a depth information image (or a depth information map). The depth information means an information of a real distance between the camera and the object.

The depth information image is mostly used for generating a three-dimensional virtual viewpoint image. A standardization of a three-dimensional video as a relating research is now progressing in the JCT-3V (Joint Collaborative Team on 3D Video Extension Development), which is a joint standardization group of the MPEG (Moving Picture Experts Group) of ISO/IEC and the VCTE (Video Coding Experts Group) of ITU-T.

The standard of a three-dimensional video includes a progressed data format, which can support play of an autostereoscopic image as well as a stereoscopic image using a general image and a depth information image thereof, and a standard for the relating technology.

The Microsoft launched the Kinect sensor as a new input device for the XBOX-360 game machine in the November of 2010. In FIG. 2, the Kinect input device perceives and transmits a movement of a person to a computer system and includes a 3D depth sensor as well as an RGB camera. In addition, the Kinect input device generates and provides an RGB image and a depth information map (a depth map) up to 640×480 to the connected computer system. In year 2014, further, the Intel presented 720p CREATIVE SENZ3D webcam having a depth sensor of 320×240 for a notebook computer, the Apple launched an iSense as a 3D scanner for an iPad using an RGB camera and a depth sensor, and the Google presented a Tango Smartphone having a depth sensor.

Figure 3:
FIG. 3 is a view showing a product of a webcam.

FIG. 3 is a view showing a product of a CREATIVE SENZ3D webcam.

In FIG. 3, a CREATIVE SENZ3D webcam is shown. The left view shows a product of the SENZ3D webcam, and the right view shows a prototype of the SENZ3D webcam.

Figure 4:
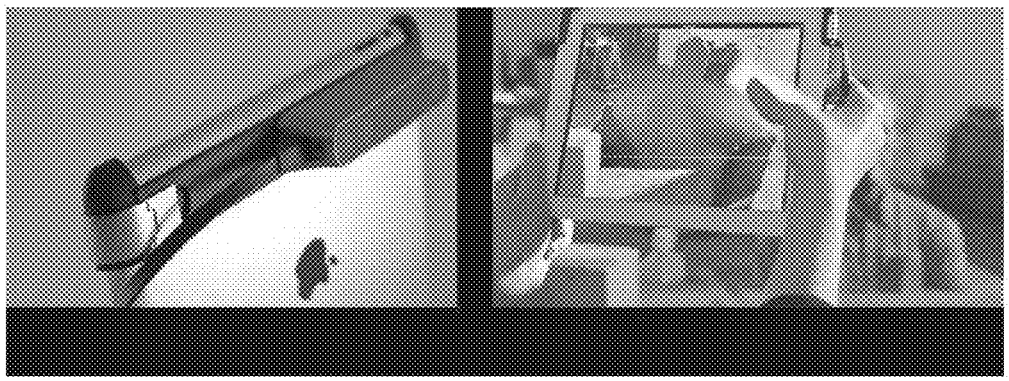
FIG. 4 is a view showing an iSense 3D scanner device.
Figure 5:
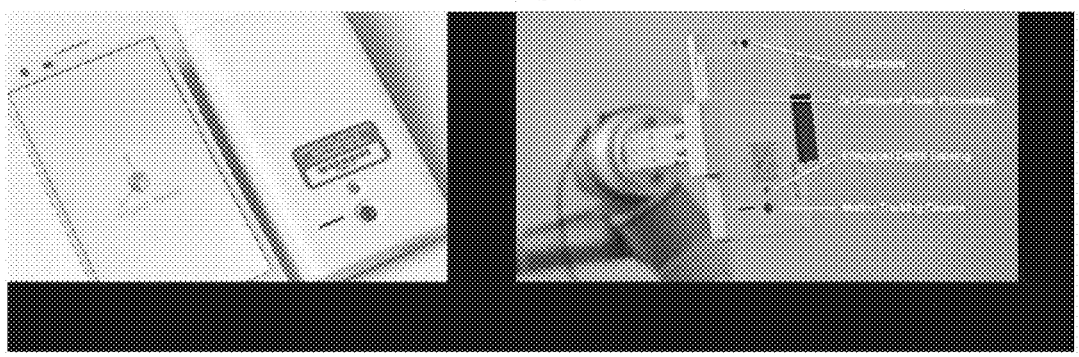
FIG. 5 is a view showing a Google Tango Smartphone.

FIG. 4 is a view showing an iSense 3D scanner device, and FIG. 5 is a view showing a Google Tango Smartphone.

In FIG. 4, the left view shows a product of the iSense, and the right view shows a scanning treatment through the iSense. In FIG. 5, the left view shows a product of the Google Tango Smartphone, and the right view shows a prototype of the Google Tango Smartphone.

The advent of the image device such as the Kinect, the iSense 3D scanner and the Intel SENZ3D webcam and the Google Tango Smartphone serves as a momentum for a public enjoyment of various applications such as two-dimensional and three-dimensional games or an image service and shows that a video device having a depth information camera or sensor becomes popular.

It is forecast that the video system is developed as a device where a general image camera is combined with a depth camera for basically supplying a two-dimensional and three-dimensional application image service as well as a two-dimensional general image service or an assist device in a handheld system.

The video system, where the general image camera and the depth camera are basically combined, is new method using the depth information in a three-dimensional video codec as well as a two-dimensional video codec.

In addition, encoding of a general image is performed by using a typical video codec intactly in the camera system including the depth information camera. For example, the typical video codec may include MPEG-1, MPEG-2, MPEG-4, H.261, H.262, H.263, H.264/AVC, MVC, SVC, HEVC, SHVC, 3D-AVC, 3D-HEVC, VC-1, VC-2 and VC-3, and the general image may be encoded by using the other various codecs.

Figure 6:
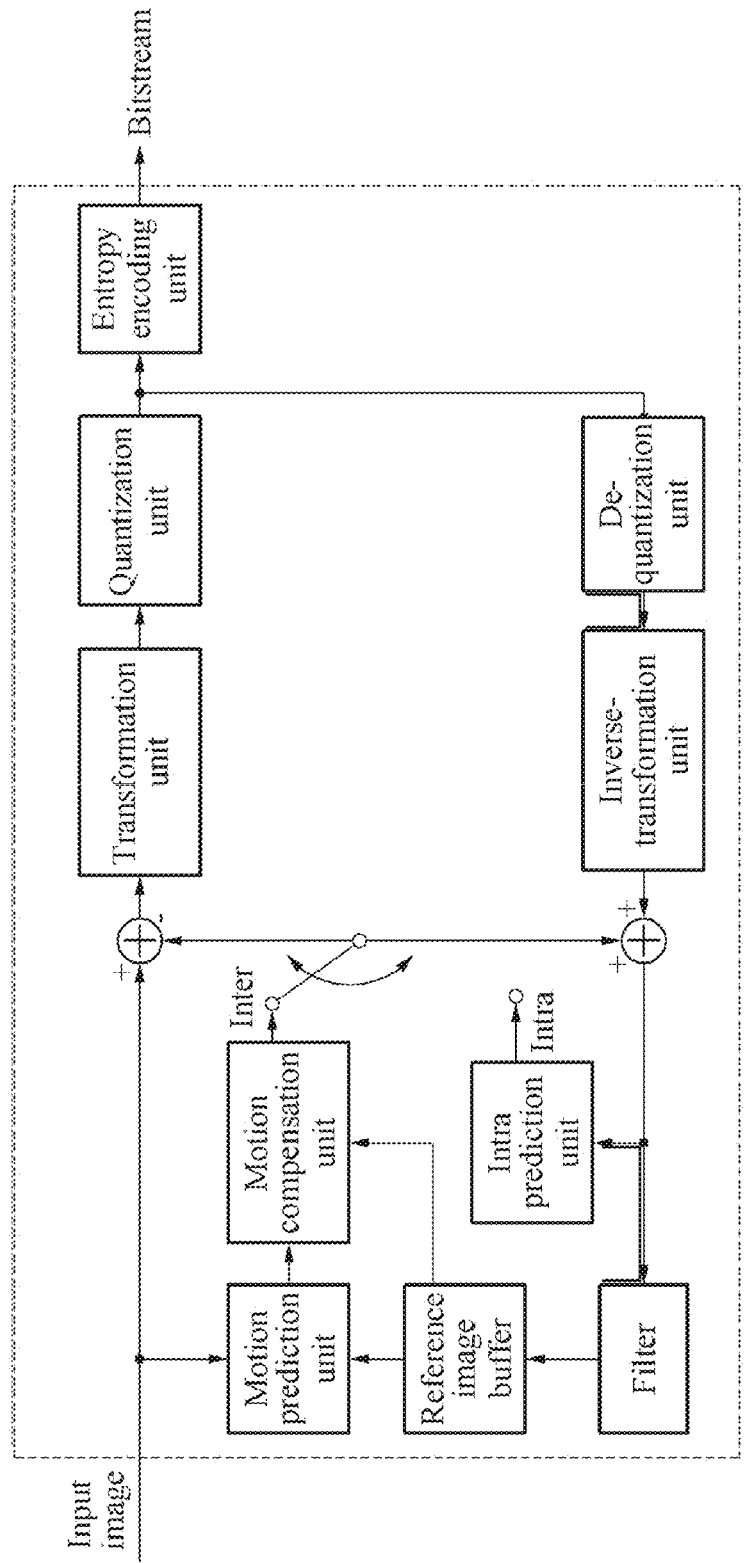
FIG. 6 is a view explaining an HEVC encoding apparatus.

FIG. 6 is a view explaining an HEVC encoding apparatus.

As an exemplary method of encoding a real image and a depth information map thereof, encoding may be performed by using HEVC (High Efficiency Video Coding) where standardization is completed jointly in MPEG (Moving Picture Experts Group) and VCEG (Video Coding Experts Group) having a maximum coding efficiency among video coding standards that have been developed up to the present. The HEVC includes various algorithms such as a unit and a structure of encoding, an inter prediction between images, an intra prediction in an image, an interpolation, a filtering and a transformation. FIG. 6 shows an example of a structure of an image encoding apparatus using the HEVC.

In FIG. 6, a SAO (Sample Adaptive Offset) may be disposed between a filter and a reference image buffer. The SAO may add an optimum offset value to a pixel value for compensating a coding error.

Since the HEVC performs an inter prediction encoding, i.e. a prediction encoding between images, it is necessary to decode and store the current encoded image for using as a reference image. Accordingly, a quantized coefficient is de-quantized in a de-quantization unit and is inversely transformed in an inverse-transformation unit. A de-quantized and inversely-transformed coefficient is added to a prediction block by an adder and a restoration block is generated. The restoration block through the filter is stored in the reference image buffer.

Figure 7:
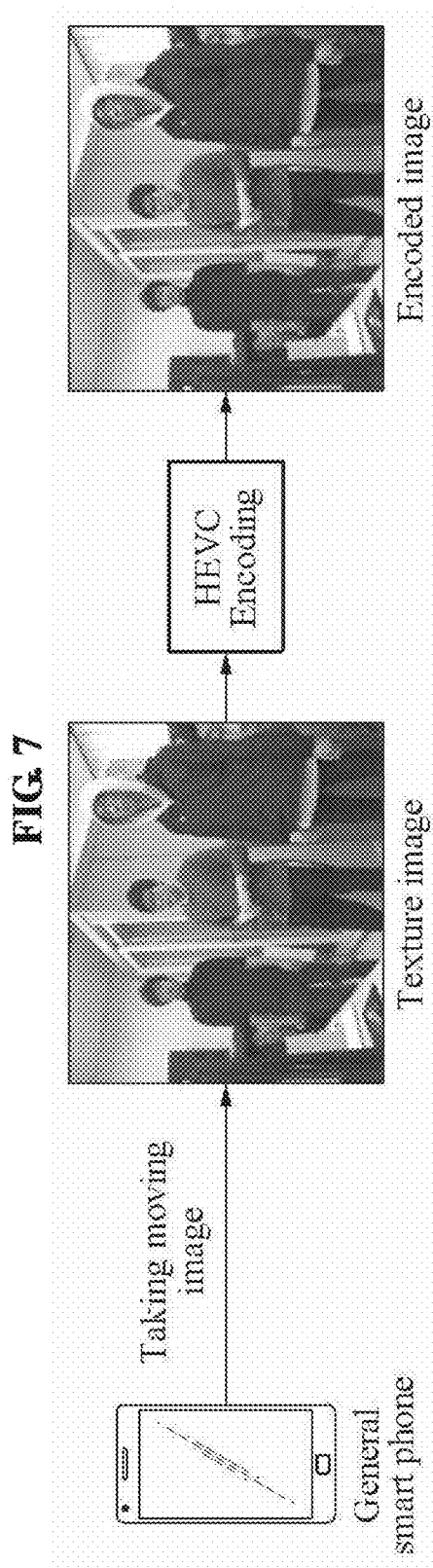
FIG. 7 is a view explaining an exemplary encoding of an image by HEVC in a smart phone.
Figure 8:
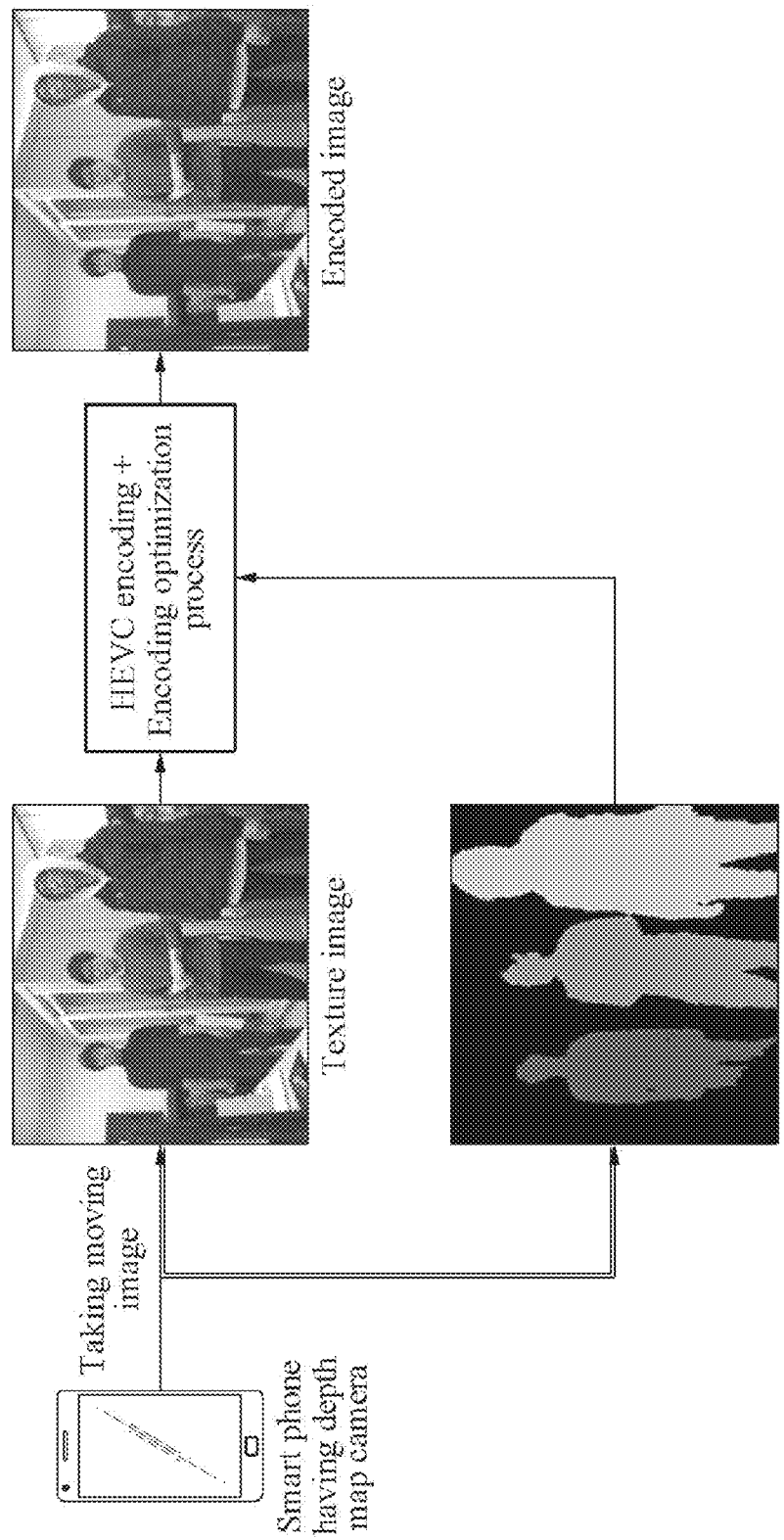
FIG. 8 is a view explaining an example encoding of an image by HEVC with a depth image in a smart phone.

FIG. 7 is a view explaining an exemplary encoding of an image by HEVC in a smart phone, and FIG. 8 is a view explaining an exemplary encoding of an image by HEVC with a depth image in a smart phone.

Referring to FIG. 7, in a smart phone including an HEVC encoder, an image taken by the smart phone is encoded by the HEVC encoder, and a service is provided by using the encoded image.

Referring to FIG. 8, in a smart phone including a depth camera, a general image (a texture image) and a depth image are independently generated by the smart phone, and an improved encoded image is obtained due to reduction of complexity by the HEVC encoder through optimization using a correlation between the texture image and the depth image.

Although the patent document 1 (US 2014/0085416) discloses a structure of verifying the information regarding the object of the current block from the depth map and merging the blocks, the patent document 1 (US 2014/0085416) does not disclose how a motion vector of a present CU is obtained by using the depth information at all.

In addition, the patent document 2 (KR 10-2012-0137305) and the patent document 3 (KR 10-2014-0048784) does not disclose a content using the depth map at all, or does not clearly suggest a constitution for reducing the amount of calculation for obtaining the motion vector during prediction of a division structure of CU.

Figure 9:
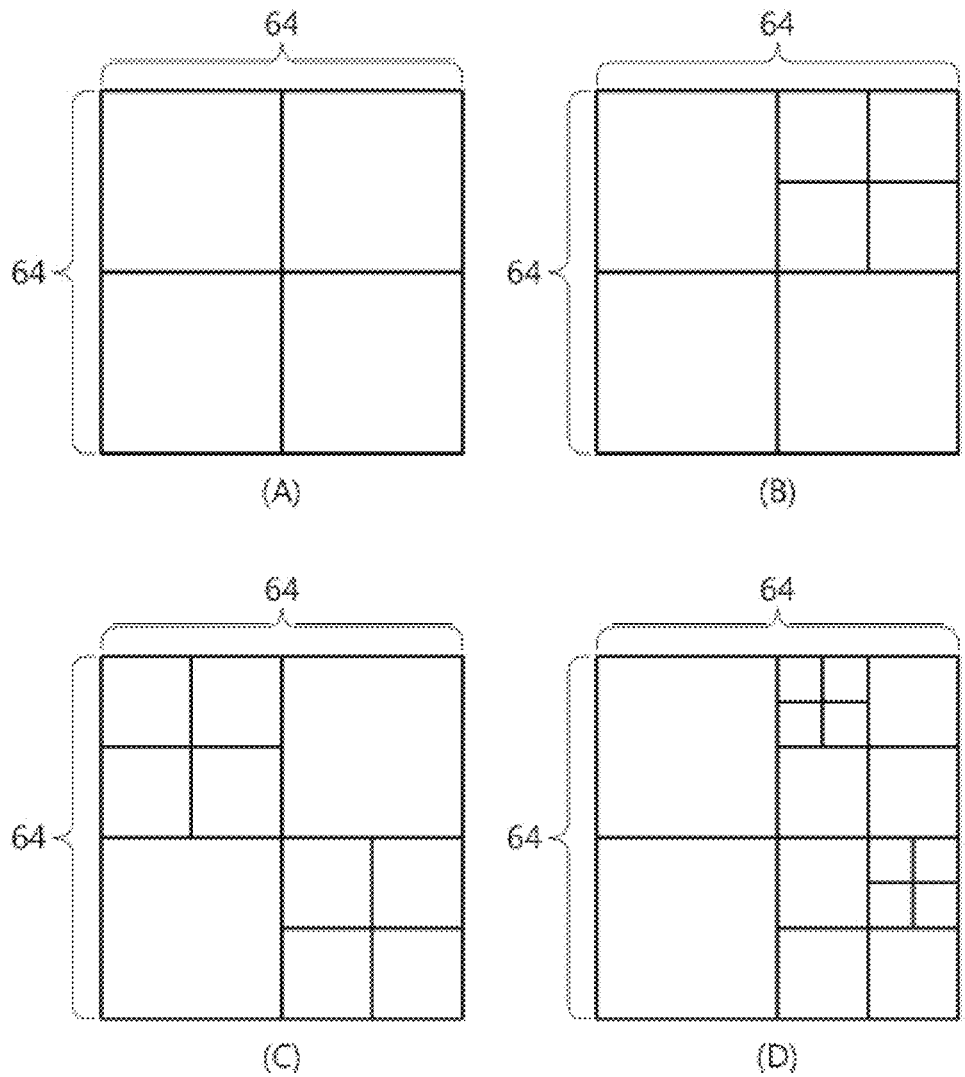
FIG. 9 is examples of dividing an image into a plurality of units.

FIG. 9 is examples of dividing an image into a plurality of units.

In a method of encoding a video with high efficiency, an encoding is performed by dividing an image into a largest coding unit (LCU) which is a fundamental unit of a coding unit (CU).

Although the CU performs a role similar to a macro block (MB) which is a fundamental block of H.264/AVC of a typical video codec, the CU may have a variable size differently from the MB having a fixed size of 16×16. In addition, the LCU, which is divided for encoding, may be divided again into a plurality of CUs, each of which has a size smaller than the LCU, for efficient encoding.

Referring to FIG. 9, the LCU having a size of 64×64 may be divided into a plurality of CUs through various ways.

FIG. 9(A) shows an example of dividing an LCU having a size of 64×64 and a division depth of 0 into a plurality of CUs each having a size of 32×32 and a division depth of 1. FIG. 9(B) shows an example of dividing one of a plurality of CUs each having a size of 32×32 into a plurality of CUs each having a division depth of 2, and FIG. 9(C) shows an example of dividing two of a plurality of CUs each having a size of 32×32 into a plurality of CUs each having a division depth of 2. FIG. 9(D) shows an example including a plurality of CUs each having a division depth of 3. Accordingly, a division structure candidate of LCU or CU may exist in various ways.

A division structure of LCU is a division information of a coding unit. After various division structures as mentioned above are generated and stored in a division structure candidate, one division structure of a division structure candidate of LCU is selected by LCU as an optimum LCU division structure at a step of determining an optimum LCU division structure. Since the encoding is performed on the basis of the adaptive LCU division structure in accordance with an image property by LCU, efficient encoding may be performed in coding efficiency and image quality.

In the two-dimensional video codec according to the prior art, algorithms are designed without reflecting use of the depth information. However, since the real image and the depth information image thereof have great correlation, the method of using the depth information in the two-dimensional video encoding may be considered by developing an algorithm reflecting the depth information based on that the depth information can be used for the encoding the two-dimensional image.

The basic principle of the present disclosure for the efficient encoding in the two-dimensional video codec is to use the depth information in a method of predicting a motion so that the depth information obtained by the depth information camera can be utilized for the encoding of the real image.

For example, when the encoding is performed by classifying the objects of the general image using the depth information image, complexity of the encoding of the general image may be greatly reduced.

Here, the objects means a plurality of objects and may include the background image. In the block-based encoding codec, a plurality of objects may be exist in a block and different encoding methods may be applied to the plurality of objects based on the depth information image.

FIG. 10 is an example of an obtaining method for a motion information of a current block from a reference block according to the prior art.

Referring to FIG. 10(A), a motion vector (MV) as a motion information is obtained from a distance between a "Current block", which is currently predict, and a block being closest to a reference image.

In this instance, referring to FIG. 10(B), a motion vector predictor (MVP) as a motion information is determined through peripheral blocks A, B, C and D of the current block, and a motion vector difference (MVD) is obtained from the MVP.

In this instance, the obtained MVP may be used in an encoding process of video.

FIG. 11 is an example of an obtaining method for a motion vector according to the prior art.

FIG. 11 shows an exemplary method of obtaining an MV from an encoding of a motion information of prediction between images regarding a current coding unit (CU) in an encoding process using the HEVC.

FIG. 11(A) shows a flow chart for obtaining the MV in the HEVC, and FIG. 11(B) shows an exemplary method of a motion search.

Referring to FIG. 11(A), i) a location of the closest block from a current CU is found by using a diamond searching method to locations inside a motion searching region from a reference frame, and ii) an optimum MV is found by minutely comparing peripheral locations with respect to corresponding location by using a two-point searching method.

Referring to FIG. 11(B), an optimum location of "4" is found from a search start location "1" of a current CU by the diamond searching method, and the optimum MV is found using a "5" location which is found by the two-point searching method from corresponding location.

In a motion searching method in the HEVC, the MVs are obtained from corresponding locations by using a searching algorism method to locations inside the motion searching region without variation, and the optimum MV is selected from the MVs. Since a correlation between a block, from which the MV is obtained, and the locations inside the motion searching region is not known, the MVs of all locations are found in the above method. In addition, unnecessary calculations regarding locations without a correlation in the CU, from which the MV is obtained, and the searching region such that the complexity of encoding is increased.

In the above process of obtaining the MV, the object information regarding peripheral blocks is not considered. Since the object information in the image should be extracted by a two-dimension image analysis without a depth camera, a method using the object information is never installed on an existing two-dimension video encoding method.

With the same reason, in the HEVC, the encoding method using the object information is never installed on a method of obtaining the MV in the motion prediction in an image. However, when the object information is considered by using the depth camera, the correlation between the corresponding CU and the searching region in the motion prediction may be obtained. As a result, when the searching region is set-up, the encoding complexity is efficiently reduced.

Accordingly, in a case of using the depth information to a motion search, by restricting a motion search range with respect to the corresponding region by judging the same object region as the corresponding CU, the encoding complexity is efficiently reduced.

Figure 12:
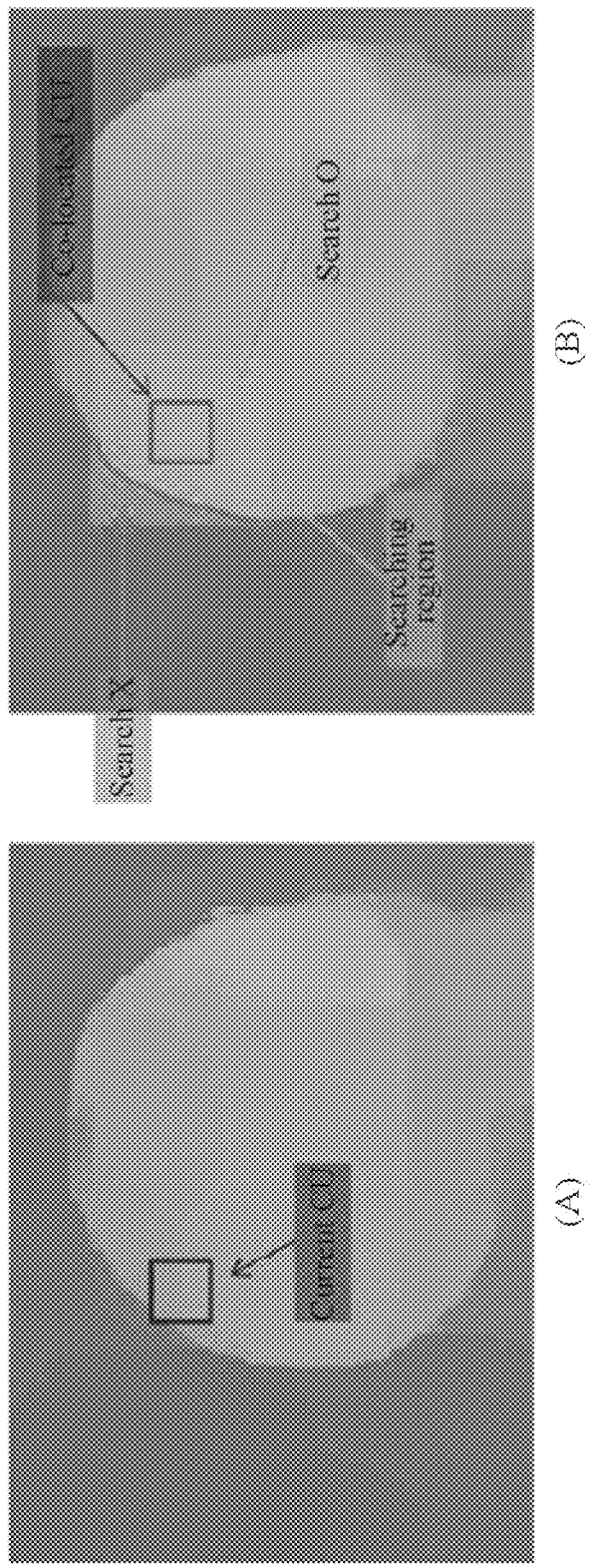
FIG. 12 is examples of a depth image.

FIG. 12 is examples of a depth image.

FIG. 12(A) shows a depth image of an image frame, for example, an 84$^{th}$ image frame, from a depth camera, and FIG. 12(B) shows a depth image of an image frame, for example, an 83$^{th}$ image frame, from a depth camera.

In a case of the image of FIG. 12(A) as a current image and the current CU having a single object, when a motion searching is performed from a reference frame in FIG. 12(B), the same object region in a motion searching region may be determined by using the depth information.

A probability of the optimum MV in the same object region as the current CU is high, while a probability of the optimum MV in the different object region than the current CU is low. Accordingly, when the same object region as the current CU is determined, the amount of calculation being necessary for the motion search may be reduced by not performing the motion search to a region, which is not the same object region as the current CU, among motion searching regions.

In the method of the present invention, the same object region is determined by using the depth information in the searching range determination of the motion prediction with respect to the block such that the motion information is encoded.

Figure 13:
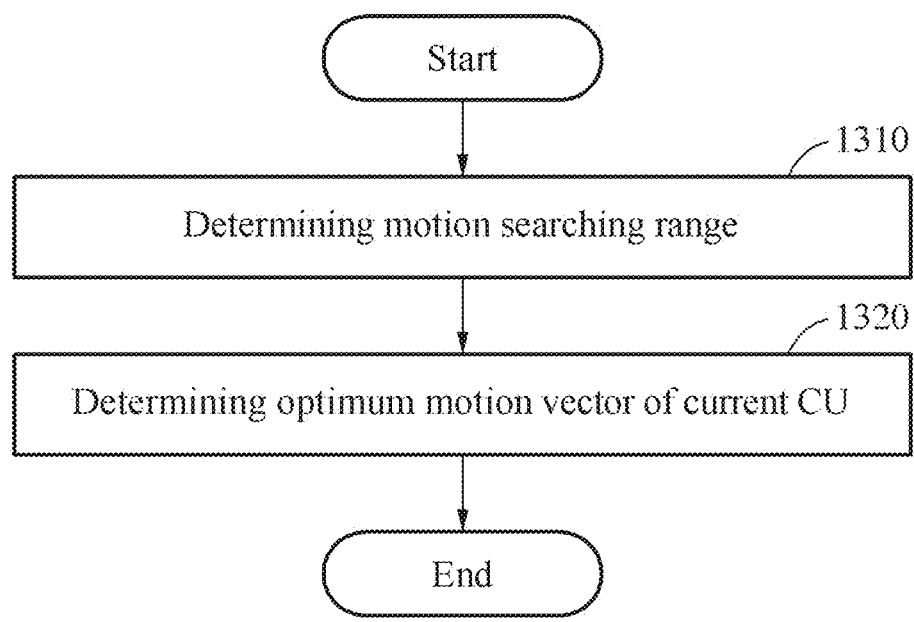
FIG. 13 is a flow chart for explaining a determining method for a motion vector according to an exemplary embodiment of the present invention.

FIG. 13 is a flow chart for explaining a determining method for a motion vector according to an exemplary embodiment of the present invention.

Referring to FIG. 13, in a step of "1310", an image encoding apparatus determines a motion searching range from a total motion searching regions for a motion vector calculation of a current coding unit (CU) based on an object information of a current CU.

For example, the total motion searching regions for the motion vector calculation of the current coding unit (CU) may be the "current regions" shown in FIG. 12(B).

In this instance, the motion searching range may be the same object region as the object constituting the current CU.

For example, the motion searching range may be the "search O" part except the "search X" part.

The "1310" step determining the motion searching range may include a step of verifying a depth information of the current coding unit (CU) from a depth image.

In addition, the "1310" step determining the motion searching range may include a step of determining the object information of the current CU based on the depth information, judging whether the current CU has a single object or not based on the object information of the CU, and excluding a different region than the single object of the CU among the total motion searching regions from the motion searching region when the current CU has the single object.

In this instance, the depth information may be a label value of the object information image, which is labeled by a labeling algorism, or a depth value distribution information obtained from the depth image. For example, the labeling algorism may be a Watersherd labeling algorism.

Figure 18:
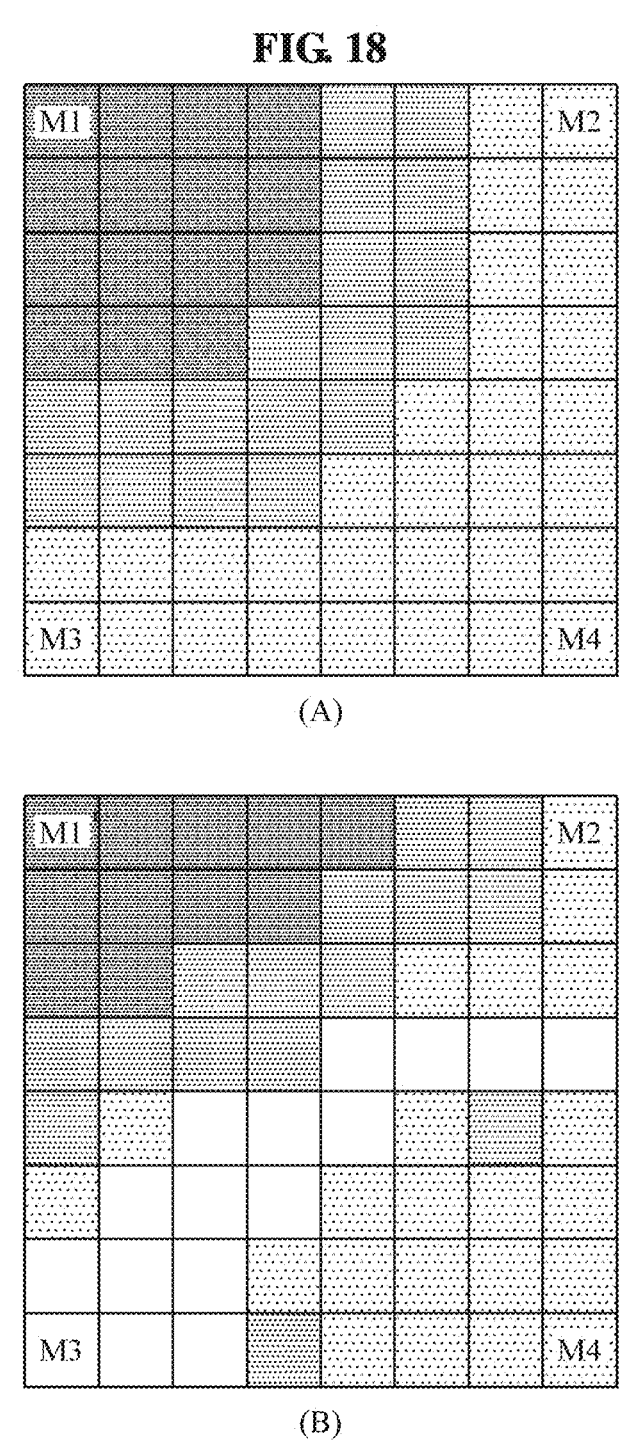

In this instance, the depth value distribution information of the CU may be obtained by an example shown in FIG. 18.

For example, when a difference between a maximum value and a minimum value included in the depth value distribution information of the current CU is less than a reference value, it may be determined that the current CU has a single object.

The "1310" step determining the motion searching range may include a step of determining whether the current CU has a single object or not based on a size of the current CU and the maximum and minimum values included in the depth value distribution information of the current CU. For example, the "1310" step may include "1610" and "1620" steps in FIG. 16.

In a step of "1320", the image coding apparatus determines an optimum motion vector of the current CU based on a motion information inside a motion searching range.

In this instance, the method of determining the optimum motion vector of the current CU may be the method explained with reference to FIGS. 10 and 11 regarding the "search O" part except the "search X" part in FIG. 12(B).

Figure 14:
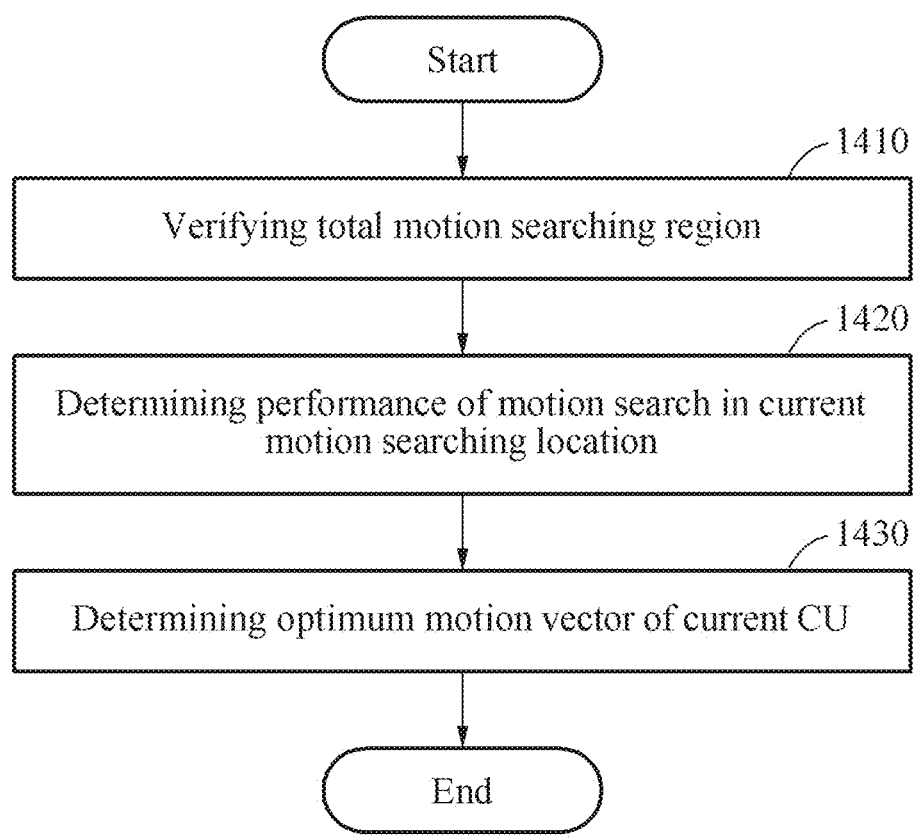
FIG. 14 is a flow chart for explaining a determining method for a motion vector according to another exemplary embodiment of the present invention.

FIG. 14 is a flow chart for explaining a determining method for a motion vector according to another exemplary embodiment of the present invention.

Referring to FIG. 14, in a step of "1410", an image encoding apparatus verifies a total motion searching region for calculating a motion vector of a current coding unit (CU).

In a step of "1420", it is determined whether a motion search in a current motion searching location is performed or not according to a depth information of the current CU extracted from a depth image.

In this instance, the "1420" step determining the motion search may include whether the current CU has a single object or not based on a size of the current CU and the maximum and minimum values included in the depth value distribution information of the current CU.

In addition, in the "1420" step determining the motion search, when the size of the current CU is greater than a reference value and a difference between a maximum value and a minimum value among four-corner depth values of the current CU is less than a reference value, the image encoding apparatus stores one of the four-corner depth values, and then determines to search a current location when a depth value of a current motion searching location is equal to the stored value and not to search the current location when the depth value of the current motion searching location is different from the stored value.

Moreover, in the "1420" step determining the motion search, when the size of the current CU is smaller than a reference value and four-corner depth values of the current CU are same as one another, the image encoding apparatus stores one of the four-corner depth values, and then determines to search a current location when a depth value of the current motion searching location is equal to the stored value and not to search the current location when the depth value of the current motion searching location is different from the stored value.

In a step of "1430", by considering possibility of the motion search, an optimum motion vector of the current CU is determined.

Figure 15:
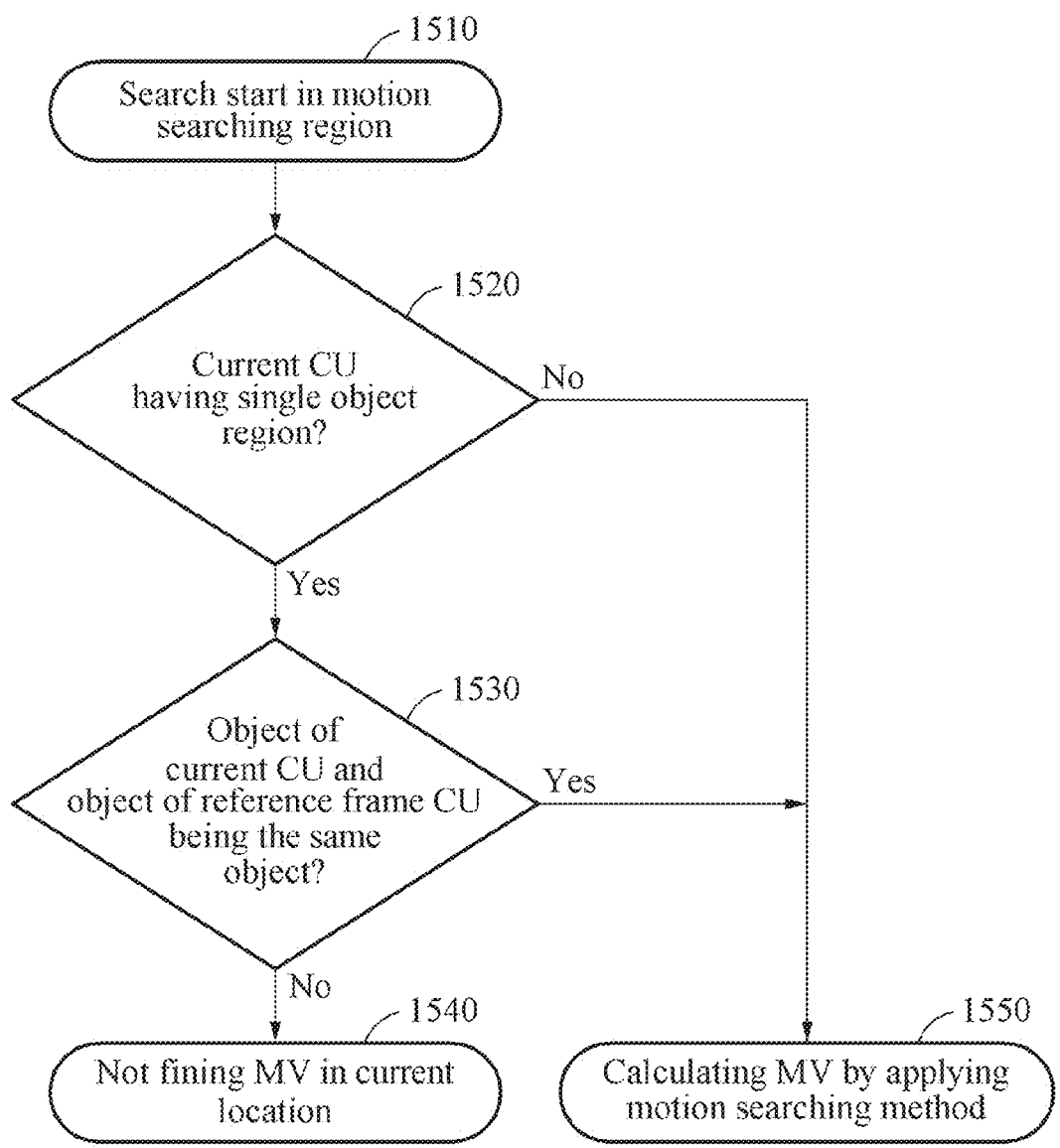
FIG. 15 is a view explaining an exemplary searching method of a motion according to an exemplary embodiment of the present invention.

FIG. 15 is a view explaining an exemplary searching method of a motion according to an exemplary embodiment of the present invention.

In a step of "1510", an image encoding apparatus starts to search a motion searching region. In a step of "1520", it is determined whether a current CU has a single object region or not. When the current CU has a single object region, a step of "1530" is performed. When the current CU has a non-single object region, a motion vector can be calculated by applying a conventional motion searching method according to the prior art in a step of "1550".

In the "1530" step, when an object in a location of a reference frame and an object of the current CU are the same object region or the same object, the image encoding apparatus calculates the motion vector of the corresponding location in the "1550" step. When the object in the location of the reference frame and the object of the current CU are not the same object region or the same object, the image encoding apparatus stores an information of not finding the motion vector of the current location in the "1540" step and finishes the motion searching process.

Figure 16:
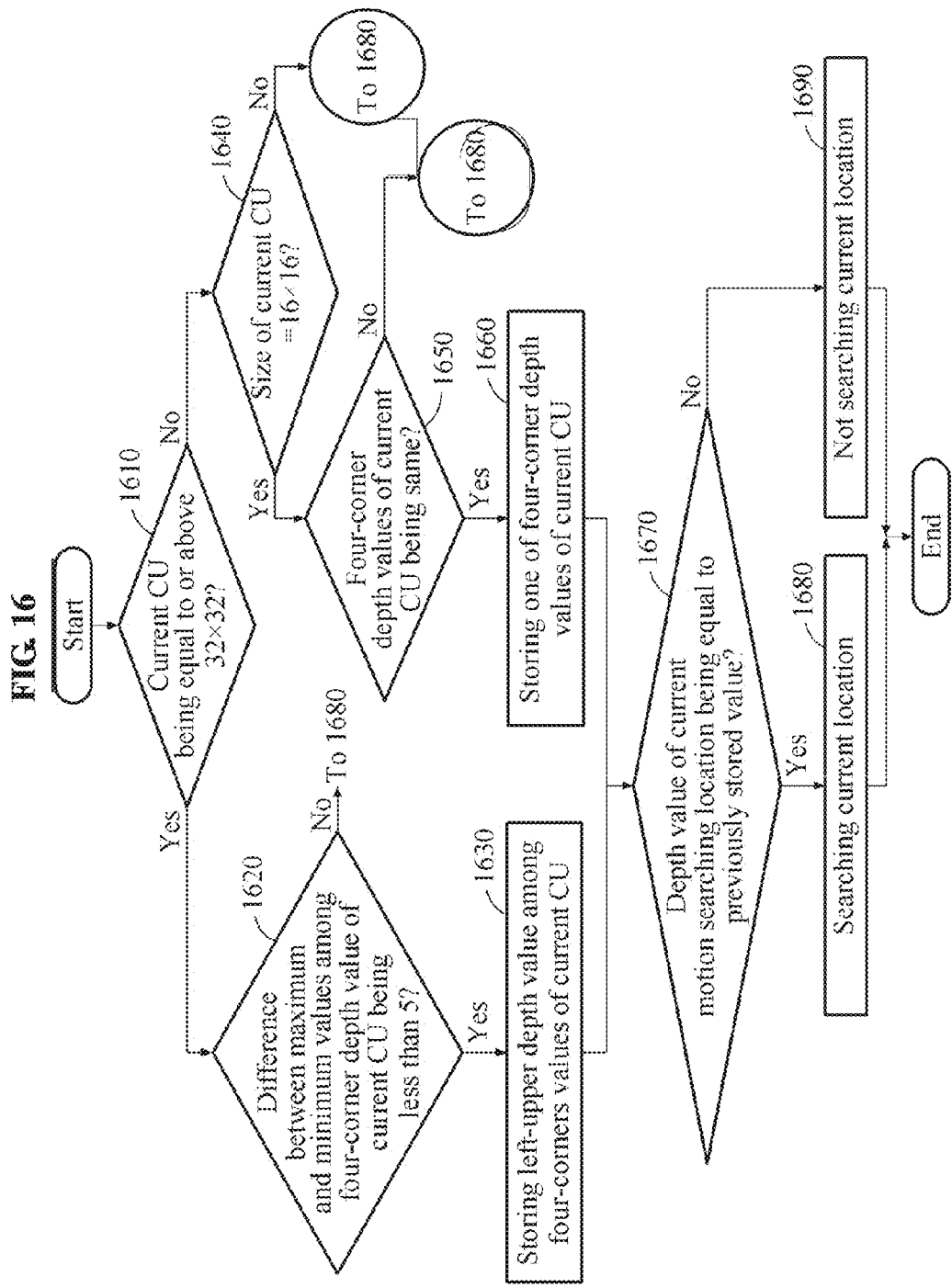
FIG. 16 is a view explaining a searching method of a motion using a depth information according to an exemplary embodiment of the present invention.

FIG. 16 is a view explaining a searching method of a motion using a depth information according to an exemplary embodiment of the present invention.

FIG. 16 shows an example of determining whether it is a single object or not and whether a motion search is performed or not in a current location.

In a step of "1610", an image encoding apparatus verifies a size of a current CU is 64×64 or 32×32 and performs a step of "1620" in a case of 32×32. In a different case, the image encoding apparatus performs a step of "1640".

In the "1620" step, it is determined whether a difference between a maximum value and a minimum value among four-corner values of a current CU from a depth value distribution information is less than 5 or not. In this instance, when the difference between the maximum and minimum values is less than 5, a step of "1630" is performed. When the difference between the maximum and minimum values is not less than 5, a step of "1680" is performed.

In the "1630" step, the image encoding apparatus stores a left-upper depth value of the four corners of the current CU and performs a step of "1670".

In the "1640" step, the image encoding apparatus verifies whether a size of the current CU is 16×16 or not. In a case of 16×16, a step of "1650" is performed. In other case, the "1680" step is performed.

In the "1650" step, it is verifies whether the four-corner depth values of the current CU are equal to one another. When the four-corner depth values are equal, a step of "1660" is performed. When the four-corner depth values are not equal, the "1680" step is performed.

In the "1660" step, the image encoding apparatus stores one of the four-corner depth values of the current CU and performs the "1670" step.

In the "1670" step, the image encoding apparatus verifies whether a depth value of a current motion searching location is equal to the stored value in the previous step (the "1630" step or the "1660" step) or not.

In this instance, when the depth value in the current motion searching location, i.e., a current motion searching point, is equal to the previously stored value, a motion information of a current location is searched in the "1680" step. In other case, it is determined not to search the motion information of the current location in a step of "1690", and then a motion searching process is finished.

Figure 17:
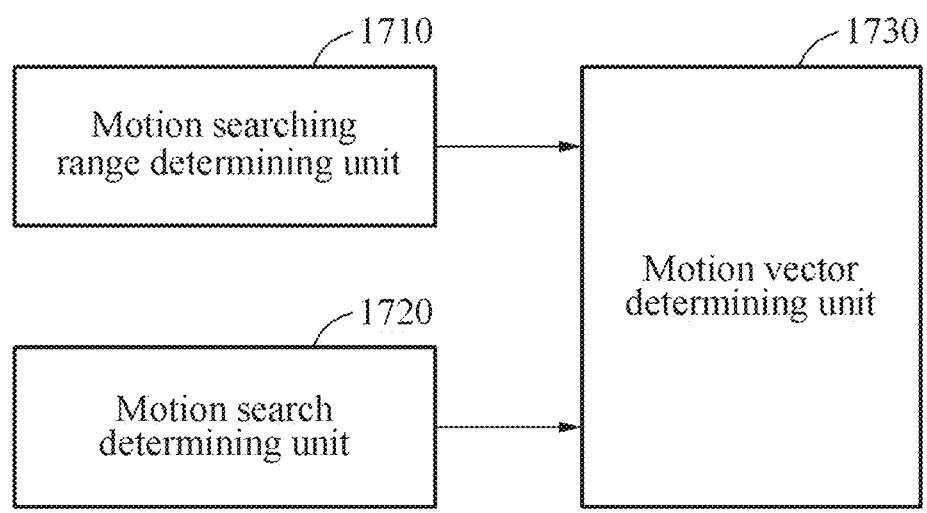
FIG. 17 is a view explaining a structure of an image encoding apparatus according to an embodiment of the present invention.

FIG. 17 is a view explaining a structure of an image encoding apparatus according to an embodiment of the present invention.

Referring to FIG. 17, an image encoding apparatus 1700 performs at least one method of FIGS. 13 to 16.

The image encoding apparatus 1700 includes at least two of a motion searching range determining unit 1710, a motion search determining unit 1720 and a motion vector determining unit 1730.

For example, the image encoding apparatus 1700 may include the motion searching range determining unit 1710 and the motion search determining unit 1720. On the other hand, the image encoding apparatus 1700 may include the motion search determining unit 1720 and the motion vector determining unit 1730.

The motion searching range determining unit 1710 determines a motion searching range in a total motion searching region for calculating a motion vector of a current coding unit (CU) based on an object information of the current CU.

In this instance, the motion searching range may be the same object region as an object constituting the current CU.

When the current CU has a single object, the motion searching range determining unit 1710 may exclude a region, which is not same as the single object of the CU, among the total motion searching region from the motion searching range.

The motion searching range determining unit 1710 may judge whether the current CU has the single object or not based on a size of the current CU and maximum and minimum values included in a depth value distribution information of the current CU.

The motion search determining unit 1720 verifies the total motion searching region for calculating the motion vector of the current coding unit (CU) and determines whether a motion search in a current motion searching location according to a depth information of the current CU, which is extracted from a depth image, is performed or not.

When a size of the current CU is greater than a reference value and a difference between a maximum value and a minimum value among four-corner depth values of the current CU is less than a reference value, the motion search determining unit 1720 stores one of the four-corner depth values of the current CU.

In addition, when the size of the current CU is smaller than a reference value and four-corner depth values of the current CU are same as one another, the motion search determining unit 1720 stores one of the four-corner depth values of the current CU.

When a depth value of a current motion searching location is equal to the stored value, the motion search determining unit 1720 may determine to search the current location. When the depth value of the current motion searching location is equal to the stored value, the motion search determining unit 1720 may determine not to search the current location.

The motion vector determining unit 1730 determines an optimum motion vector of the current CU based on a motion information inside a motion searching range.

FIG. 18 is a view showing examples of a depth value distribution of a CU.

In the method of encoding an image according to an embodiment, as an example of a method of judging whether the CU or the block is formed of the same single object or not, depth values at four edges of the CU or the block may be used.

Referring to FIG. 18, the apparatus of encoding an image may judge that the depth value distribution of the CU such as (A) is uniform with a small change.

On the other hand, the apparatus of encoding an image may judge that the depth value distribution of the CU such as (B) is not formed of a single object because the change is great.

Referring to FIG. 18(B), the change of the depth value at a central portion in the CU and edge portions is very great and the difference between the maximum and the minimum of the depth values at the four edge portions is great. Since the probability that this CU is formed of a single object is low, the division of the CU may be performed.

When the difference between the maximum and the minimum of the depth values at the four edge portions is equal to or smaller than a predetermined reference value, the apparatus of encoding an image may judge that the CU is formed of a single object.

In FIG. 18(A), for example, the normalized depth value at M1 may be 9, the normalized depth value at M2 and M3 may be 7, and the normalized depth value at M4 may be 7.

In FIG. 18(B), the normalized depth value at M1 may be 9, the normalized depth value at M2 and M4 may be 7, and the normalized depth value at M3 may be 1.

Here, the difference between the maximum and the minimum of the depth values at the four edge portions is 2 in FIG. 18(A), and the difference between the maximum and the minimum of the depth values at the four edge portions is 8 in FIG. 18(B).

Accordingly, when the predetermined reference value is 5, it may be judged that FIG. 18(A) is formed of a single object and FIG. 18(B) is not formed of a single object.

Table 1 illustrates an experimental result where the embodiment shown in FIG. 25 is applied to HEVC.

It is verified through the experimental result that complexity of the encoding is reduced without great deterioration in image quality In embodiments of the present disclosure, an object scope or an application scope may vary according to a block size or a division depth of a CU, etc.

Here, a variable determining an application scope (i.e. a size or a depth information) may be set such that an apparatus of encoding and an apparatus of decoding use a predetermined value or a value determined according to a profile or a level. Alternatively, a variable determining an application scope (i.e. a size or a depth information) may be set such that an apparatus of encoding writes a variable value on a bitstream and an apparatus of decoding reads the value from the bitstream. Table 2 illustrates a case where an application scope varies according to a CU division depth. A method A may be a method applied to only a depth equal to or greater than a predetermined depth value, a method B may be a method applied to only a depth equal to or smaller than a predetermined depth value, and a method C may be method applied to only a predetermined depth value.

TABLE 2

| CU depth representing application scope | method A | method B | method C |
|---|---|---|---|
| 0 | X | O | X |
| 1 | X | O | X |
| 2 | O | O | O |
| 3 | O | X | X |
| 4 | O | X | X |

Table 2 illustrates an example of methods of determining an application scope for a method of the present disclosure when a CU division depth is 2. (O: applied to the corresponding depth, X: not applied to the corresponding depth)

When the methods of the present disclosure are not applied to all depths, a flag may be written on the bitstream. Alternatively, when the methods of the present disclosure are not applied to all depths, the variable may be expressed by signaling a value greater than the maximum of the CU depths by one with a CU depth value representing the application scope.

In addition, the above methods may be differently applied to a chrominance block according to a size of a brightness block and may be differently applied to a brightness signal image and a chrominance image.

Table 3 illustrates an examples where methods are differently applied according a size of a brightness block and a chrominance block when the methods are combined.

TABLE 1

| | | Low-delay Main | | | | Random-access Main | | | |
|---|---|---|---|---|---|---|---|---|---|
| | | Y BD-rate | U BD-rate | V BD-rate | Encoding Time | Y BD-rate | U BD-rate | V BD-rate | Encoding Time |
| 3DV Test Sequence | Balloons | 0.0% | 0.2% | 0.2% | 94.5% | 0.0% | 0.0% | 0.1% | 93.2% |
| | Kendo | 0.0% | 0.3% | 0.9% | 89.6% | 0.1% | 0.5% | 0.3% | 93.1% |
| | Newspaper_CC | −0.1% | −0.2% | 0.2% | 94.9% | 0.0% | −0.1% | −0.1% | 96.3% |
| | Poznan_Hall2 | 0.1% | 1.5% | 0.8% | 94.8% | 0.0% | −0.1% | 0.1% | 96.3% |
| | Poznan_Street | 0.0% | −0.5% | 0.7% | 98.8% | 0.3% | 0.6% | 0.6% | 101.2% |
| | GT_Fly | 0.2% | 0.2% | 0.4% | 91.7% | 0.9% | 1.5% | 1.8% | 96.8% |
| | Undo_Dancer | 0.0% | 0.0% | 0.5% | 96.0% | 0.1% | 0.4% | 0.6% | 97.9% |
| | Shark | 0.0% | 0.0% | 0.1% | 92.3% | 0.5% | 0.8% | 0.8% | 98.1% |
| 1024 × 768 Average | | 0.0% | 0.1% | 0.4% | 93.0% | 0.0% | 0.2% | 0.1% | 94.2% |
| 1920 × 1088 Average | | 0.1% | 0.3% | 0.5% | 94.7% | 0.4% | 0.6% | 0.8% | 98.1% |
| Average | | 0.0% | 0.2% | 0.5% | 94.1% | 0.3% | 0.5% | 0.5% | 96.6% |

TABLE 3

| size of brightness block | size of chrominance block | application of brightness | application of chrominance | methods |
|---|---|---|---|---|
| 4(4 × 4, 4 × 2, 2 × 4) | 2(2 × 2) | O or X | O or X | a 1, 2, . . . |
| | 4(4 × 4, 4 × 2, 2 × 4) | O or X | O or X | b 1, 2, . . . |
| | 8(8 × 8, 8 × 4, 4 × 8, 2 × 8, etc.) | O or X | O or X | c 1, 2, . . . |
| | 16(16 × 16, 16 × 8, 4 × 16, 2 × 16, etc.) | O or X | O or X | d 1, 2, . . . |
| | 32(32 × 32) | O or X | O or X | e 1, 2, . . . |
| 8(8 × 8, 8 × 4, 2 × 8, etc.) | 2(2 × 2) | O or X | O or X | f 1, 2, . . . |
| | 4(4 × 4, 4 × 2, 2 × 4) | O or X | O or X | g 1, 2, . . . |
| | 8(8 × 8, 8 × 4, 4 × 8, 2 × 8, etc.) | O or X | O or X | h 1, 2, . . . |
| | 16(16 × 16, 16 × 8, 4 × 16, 2 × 16, etc.) | O or X | O or X | i 1, 2, . . . |
| | 32(32 × 32) | O or X | O or X | j 1, 2, . . . |
| 16(16 × 16, 8 × 16, 4 × 16, etc.) | 2(2 × 2) | O or X | O or X | k 1, 2, . . . |
| | 4(4 × 4, 4 × 2, 2 × 4) | O or X | O or X | l 1, 2, . . . |
| | 8(8 × 8, 8 × 4, 4 × 8, 2 × 8, etc.) | O or X | O or X | m 1, 2, . . . |
| | 16(16 × 16, 16 × 8, 4 × 16, 2 × 16, etc.) | O or X | O or X | n 1, 2, . . . |
| | 32(32 × 32) | O or X | O or X | o 1, 2, . . . |

Referring to a method g1 among modified methods of Table 3, when a size of a brightness block is 8 (8×8, 8×4, 2×8, etc.) and a size of a chrominance block is 4 (4×4, 4×2, 2×4, etc.), a method of constituting a merge list according to an embodiment of the present disclosure may be applied to a brightness signal and a chrominance signal.

Referring to a method 12 among the above modified methods, when a size of a brightness block is 16 (16×16, 8×16, 4×16, etc.) and a size of a chrominance block is 4 (4×4, 4×2, 2×4, etc.), a method of constituting a merge list according to an embodiment of the present disclosure may be applied to a brightness signal and may not be applied to a chrominance signal.

In addition, a method of constituting a merge list according to an embodiment of the present disclosure may be applied to a brightness signal and may not be applied to a chrominance signal by the other modified methods. On the contrary, a method of constituting a merge list according to an embodiment of the present disclosure may be applied to a chrominance signal and may not be applied to a brightness signal.

According to an embodiment of the present disclosure, efficient encoding of a two-dimensional image may be performed by encoding a two-dimensional general image using a depth information image obtained from a depth information camera.

An apparatus illustrated above may include a hardware element, a software element and/or a combination of a hardware element and a software element. For example, an apparatus and an element illustrated in an embodiment may include at least one general-purpose computer or at least one special-purpose computer such as a processor, a controller, an arithmetic logic unit (ALU), a digital signal processor, a microcomputer, a field programmable array (FPA), a programmable logic unit (PLU), a microprocessor or another apparatus which can perform an instruction and response. A processing unit may perform an operation system (OS) and at least one software application performed in the operating system. In addition, a processing unit may access, store, operate, process and generate a data in response to performance of a software. For convenience of understanding, although it is illustrated that a single processing unit is used, it is well known to those skilled in the corresponding technical field that a processing unit may include a plurality of processing elements and/or a plural kind of processing element. For example, a processing unit may include a plurality of processors or a processor and a controller. In addition, a processing unit may include another processing configuration such as a parallel processor.

A software may include a computer program, a code, an instruction or a combination of at least one thereof and may constitute a processing unit to operate as required or may order a processing unit independently or collectively. A software and/or a data may be permanently or temporarily embodied in a kind of machine, a component, a physical equipment, a virtual equipment, computer storage media, a computer storage equipment or a transmitted signal wave for being interpreted by a processing unit or providing an instruction or a data to a processing unit. A software may be dispersed in a computer system connected by a network to be stored or executed through a dispersed method.

A method according to an embodiment may be embodied as a form of a program instruction executable through various computer means to be stored in computer readable media. The computer readable media may include a program instruction, a data file, a data structure and a combination thereof. The program instruction recorded in the media may be designed and constituted specifically for an embodiment or may be well known to those skilled in a computer software to be usable. Examples of the computer readable media may include magnetic media such as a hard disk, a floppy disk, and a magnetic tape; optical media such as a CD-ROM and a DVD; magneto-optical media such as a floptical disk; and hardware equipments that are specially configured to store and perform a program instruction such as a ROM, a RAM, a flash memory, etc.

Although embodiments are illustrated with a limited number of embodiments and drawings, it will be apparent to those skilled in the art that various modifications and variations can be made from the above description. For example, a proper result may be obtained even when illustrated technologies are performed in an order different from the illustrated method and/or even when illustrated elements such as a system, a structure, a circuit, etc. are combined or mixed as a form different from the illustrated method or are substituted or replaced with different elements or equivalents.

Thus, it is intended that the present disclosure cover the modifications and variations of this disclosure provided they come within the scope of the appended claims and their equivalents.

What is claimed is:

1. An image encoding method using a depth information, comprising:
    verifying, by a processor, a depth information of a current coding unit (CU) having a variable size from a depth image:
    determining, by the processor, whether the current CU has a single object or not based on a size of the current CU and maximum and minimum depth values included in a depth value distribution information of the current CU;
    determining, by the processor, a motion searching range in a total motion searching region for calculating a motion vector of the current CU based on whether the current CU has the single object or not; and
    determining, by the processor, an optimum motion vector of the current CU based on a motion information inside the motion searching range.

2. The image encoding method according to claim 1, wherein an object in the motion searching range is same as an object in the current CU.

3. The image encoding method according to claim 1, wherein the step of determining the motion searching range includes:
    excluding a region, an object of which is not same as the single object of the current CU, among the total motion searching region from the motion searching range when the current CU has the single object.

4. The image encoding method according to claim 1, wherein the depth information includes four-corner depth values of the current CU.

5. The image encoding method according to claim 1, wherein when a difference between the maximum depth value and the minimum depth value included in the depth value distribution information of the current CU is less than a reference value, it is determined that the current CU has the single object.

6. An image encoding method using a depth information, comprising:
    verifying, by a processor, a total motion searching region for calculating a motion vector of a current coding unit (CU);
    determining, by the processor, whether a motion search in a current motion searching location is performed or not according to a size of the current CU and a depth information of the current CU extracted from a depth image, the depth information including four-corner depth values of the current CU; and
    determining, by the processor, an optimum motion vector of the current CU based on a result of the step of determining whether the motion search in the current motion searching location is performed or not.

7. The image encoding method according to claim 6, wherein the step of determining whether the motion search in the current motion searching location is performed or not includes:
    determining that the object in the motion searching range is same as the object in the current CU when a difference between a maximum value and a minimum value among the four-corner depth values of the current CU is less than a reference value.

8. The image encoding method according to claim 6, wherein the step of determining whether the motion search in the current motion searching location is performed or not includes:
    storing one of the four-corner depth values when the size of the current CU is greater than a reference value and a difference between a maximum value and a minimum value among the four-corner depth values of the current CU is less than a reference value; and
    determining to search a current location when a depth value of a current motion searching location is equal to the stored value and not to search the current location when the depth value of the current motion searching location is different from the stored value.

9. The image encoding method according to claim 6, wherein the step of determining whether the motion search in the current motion searching location is performed or not includes:
    storing one of the four-corner depth values when the size of the current CU is smaller than a reference value and the four-corner depth values of the current CU are same as one another; and
    determining to search a current location when a depth value of a current motion searching location is equal to the stored value and not to search the current location when the depth value of the current motion searching location is different from the stored value.

10. An image encoding apparatus using a depth information, comprising:
    a processor; and
    a memory configured to store instructions executable by the processor,
    wherein the processor is configured:
        to verify a depth information of a current coding unit (CU) from a depth image;
        to determine whether the current CU has a single object or not based on a size of the current CU and maximum and minimum dearth values included in a depth value distribution information of the current CU:
        to determine a motion searching range in a total motion searching region for calculating a motion vector of the current CU based on whether the current CU has the single object or not; and
        to determine an optimum motion vector of the current CU based on a motion information inside the motion searching range.

11. The image encoding apparatus according to claim 10, wherein an object in the motion searching range is same as an object in the current CU.

12. The image encoding apparatus according to claim 10, wherein the processor is configured to exclude a region, an object of which is not same as the single object of the current CU, among the total motion searching region from the motion searching range when the current CU has the single object.

13. The image encoding apparatus according to claim 12, wherein the depth information includes four-corner depth values of the current CU.

14. An image encoding apparatus using a depth information, comprising:
    a processor; and
    a memory configured to store instructions executable by the processor,
    wherein the processor is configured:
    to verify a total motion searching region for calculating a motion vector of a current coding unit (CU);
    to determine whether a motion search in a current motion searching location is performed or not according to a size of the current CU and the depth information of the current CU, which is extracted from a depth image, the depth information including four-corner depth values of the current CU; and
    to determine an optimum motion vector of the current CU.

15. The image encoding apparatus according to claim 14, wherein the processor is configured to store one of the four-corner depth values when the size of the current CU is greater than a reference value and a difference between a maximum value and a minimum value among the four-corner depth values of the current CU is less than a reference value, and wherein the processor is configured to store one of the four-corner depth values of the current CU when the size of the current CU is smaller than a reference value and the four-corner depth values of the current CU are same as one another.

16. The image encoding apparatus according to claim 15, wherein the processor is configured to determine to search a current location when a depth value of the current motion searching location is equal to the stored value, and the processor is configured to determine not to search the current location when the depth value of the current motion searching location is different from the stored value.

17. The image encoding method according to claim 4, wherein the step of the determining a motion searching range includes:

determining that the object in the motion searching range is same as the object in the current CU when a difference between a maximum value and a minimum value among the four-corner depth values of the current CU is less than a reference value.

\* \* \* \* \*